UNITED STATES PATENT OFFICE.

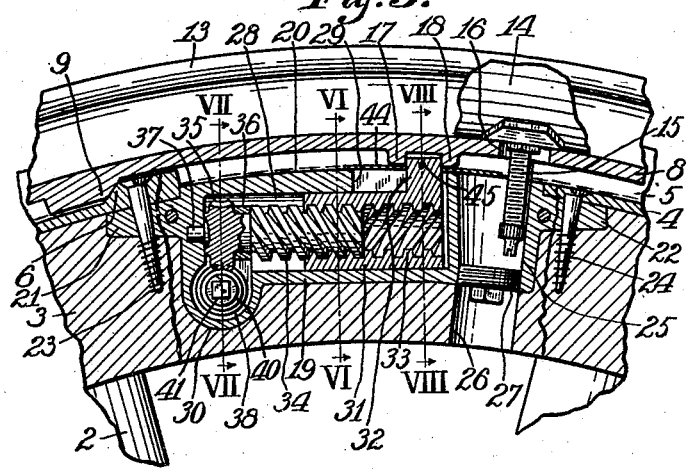

KARL I. NUTTER, OF MARTINSVILLE, INDIANA.

DEMOUNTABLE WHEEL RIM.

1,421,096.  Specification of Letters Patent.  Patented June 27, 1922.

Application filed July 22, 1921. Serial No. 486,726.

*To all whom it may concern:*

Be it known that I, KARL I. NUTTER, a citizen of the United States, residing at Martinsville, in the county of Morgan and State of Indiana, have invented a new and useful Demountable Wheel Rim, of which the following is a specification, reference being had to the accompanying drawings, and to the letters and figures of reference marked thereon.

This invention relates to a wheel rim of the type that is designed to be used on motor vehicles for connecting pneumatic tires to the wheels thereof, and has reference more particularly to a wheel having a rim that may be quickly removed from the wheel and replaced by another having a good tire thereon.

An object of the invention is to provide an improved wheel, including a demountable rim which shall be so constructed as to insure security of the rim on the wheel, and which shall permit the rim to be quickly applied to or removed from the wheel.

Another object is to provide improved construction in automobile wheels which shall insure positive and reliable locking connection between the rim and the felly portion of the wheel, and which shall not be liable to become accidentally unlocked.

A further object is to provide powerful means whereby to lock a wheel rim to the felly portion of a wheel and also to insure uniform contact with all desirable points between the rim and the wheel in case the rim be slightly untrue or not accurately circular, an aim being to provide an improved wheel of the above-mentioned character which shall be of simple construction and not costly, and which shall be durable and economical in use.

With the above-mentioned and other objects in view, the invention consists in a wheel provided with novel compound locking apparatus whereby to rigidly secure a rim removably to the wheel; and, the invention consists also further in the combinations and arrangements of parts as hereinafter particularly described and further set forth in the accompanying claims.

Referring to the drawings,—Figure 1 is a front view of an automobile wheel provided with the improved demountable rim; Fig. 2 is a fragmentary transverse sectional elevation of the improved wheel and rim with a pneumatic tire thereon, on an enlarged scale; Fig. 3 is a peripheral view of the improved wheel showing particularly the improved felly structure; Fig. 4 is a sectional view of the inner side of the improved rim; Fig. 5 is a fragmentary sectional elevation of the improved felly and locking mechanism therein on different planes and a rim thereon, on an enlarged scale; Fig. 6 is a fragmentary section approximately on the line VI—VI in Fig. 5; Fig. 7 is a fragmentary section approximately on the line VII—VII in Fig. 5; Fig. 8 is a fragmentary section approximately on the line VIII—VIII in Fig. 5; and, Fig. 9 is a plan of the main portion of the locking mechanism.

In the various figures of the drawings similar reference characters indicate corresponding elements or features of construction herein referred to more particularly and in detail.

In the drawings, the numeral 1 generally indicates a suitable wheel hub, 2 the spokes and 3 an improved felly of a wooden spoke wheel suitable for motor vehicles and particularly for automobiles, and it is to be understood that the invention is applicable to the peripheral portion of a disk wheel and to a wire wheel. The felly 3 is represented as being made of solid wood with a band thereon, but in some cases the felly may be a hollow metallic member.

Preferably the felly 3 is composed of wood and a metallic band 4 thereon which preferably has a flange 5 on its edge that is adjacent to the inner or rear side of the wheel; and the outer side of the band has a suitable number of bearing blocks or projections 6 thereon, each of which has an inclined portion or wedge face 7 extending from one end thereof, the wedge face being concave transversely. The improved rim 8 is designed to be applied to the felly and it is provided with bearing blocks or projections 9 on the inner side thereof, each of which has an inclined end or wedge face 10 that is convex transversely to operate on the wedge face 7, being adapted to prevent lateral movement of the rim on the felly. Preferably the edge of the rim that is adjacent to the front of the felly has an inner facing-ring 11 thereon that extends opposite to the front of the felly to prevent the entrance of dust or mud between the felly and the rim, such function being performed also by the flange 5. The rim has suitable flanges or beads 12 and 13 extending outwardly for retaining a pneumatic tire 14 of suitable design on the rim, the tire having an inflation tube 15 thereon as customarily that extends through an aperture 16 in the rim and into a suitable slot in the felly. The inner side of the rim 8 has two transversely extending abutment bars 17 and 18 thereon whereby to slightly turn the rim circumferentially on the felly portion of the wheel.
A novel gear case 19 is provided which preferably is composed of a suitable number of parts or sections secured together, and it is embedded in a suitable recess in the outer or peripheral portion of the felly structure, so as to constitute a portion thereof and so as to extend through a suitable opening in the band 4, the gear case having an outer face 20 that conforms in contour to the outer side or face of the band 4. The gear case is provided on its opposite ends with projections 21 and 22 that are suitably embedded in the wooden portion of the felly and secured thereto by means of suitable screws or devices 23 and 24 which preferably extend through the adjacent portions of the band under which the projections extend. The gear case preferably has a suitable chamber 25 adjacent to one end thereof that receives the inflation tube or nipple 15, and the wooden portion of the felly has an opening 26 therein extending from the chamber. The chamber is suitably closed so as to cover the inflation tube by means of a cap or plug 27 preferably connected directly to the gear case so as to close the chamber 25. The gear case has a guide chamber 28 therein and also a slot 29 extending from the chamber through the outer face 20, and the gear case has also an offset portion 30 that is a lateral continuation interiorly of the guide chamber 28. A traveling head 31 is provided which is longitudinally guided in the chamber 28 and on one portion thereof has a lug 32 rigid thereon that extends through the slot 29 and so as to extend between the abutments 17 and 18 when the rim 8 is applied to the felly. The head is hollow and has screw threads 33 therein which are engaged by a screw 34 that operates in the head and extends outward into the chamber 28. The screw has a toothed wheel or gear 35 rigid thereon, and a portion of the screw is arranged in a bearing 36 that prevents longitudinal movement of the screw, the bearing being supported in the chamber. At the end of the chamber the screw preferably has a journal 37 supported in the wall of the chamber. A worm 38 is arranged in the offset portion of the gear case and has journals 39 and 40 supported in the walls of the chamber to maintain the worm in connection with the gear 35. One journal of the worm has an operating stem 41 which is squared or otherwise adapted to be turned by means of a wrench, being arranged in an aperture 42 in the wooden portion of the felly. The felly preferably has a shutter 43 pivoted thereto for closing the aperture 42.

Preferably the slot 29 is provided with a cover 44 composed of thin metal having a suitable opening through which the lug 32 extends. The cover is designed to slide on the face 20 of the case and may be held on the lug by means of a pin 45 driven into a suitable hole in the lug.

In practical use of the invention the worm 38 prevents accidental rotation of the screw 34 but constitutes a powerful device for rotating the screw and moving the head or nut 31 without requiring great effort. On movement of the head or nut in one direction the lug 32 engages one of the abutments on the rim and causes the rim to be turned so that the wedge faces 10 are forced up on the wedge faces 7 whereby the rim is centered and tightened on the felly. A reverse movement of the head or nut brings the lug 32 into contact with the opposite one of the abutments whereby the rim is moved reversely to release the locking devices and permit the rim to be removed from place, after which another rim with an inflated tire thereon may be quickly applied to the wheel in the manner above clearly indicated.

I claim as my invention:—

1. A wheel including a felly portion having a circumferential slot therein and also wedges on its periphery, a rim provided on its innner side with two abutments and also wedges to co-operate with the wedges on the felly portion, a head movably guided in the felly portion and having a lug thereon extending through the slot to alternately engage the abutments, and means operable in the felly portion to move the head.

2. A wheel having a slot in its periphery and also a nut movably guided adjacent to the periphery and provided with a lug extending through the slot, a screw operable in the nut and rotatably supported in the wheel beyond the nut, the screw having a gear thereon, and a worm rotatably supported in the wheel in connection with the gear and having a shaft portion adapted to be engaged to rotate the worm.

3. A wheel provided on its periphery with a series of wedges and also a slot in the periphery, a rim provided on its inner side with a series of wedges and also two abutments, the different series of wedges co-operating one with the other, a head movably guided in the wheel and having a lug thereon extending through the slot and between the abutments, and a screw supported in the wheel and operatively connected with the head for controlling the lug.

4. A wheel including a felly portion, a band and a gear case connected together and embracing the felly portion, the gear case being partially embedded in the felly portion, a rim extending about the band and having two abutments therein arranged opposite to the gear case, co-operating wedging devices between the band and the rim to secure the rim to the band, an internally screw-threaded head movably guided in the gear case and having a lug thereon extending between the abutments, a screw supported in the gear case and engaging the screw-threaded head, and operating gearing supported in the gear case in connection with the screw.

5. A wheel including a felly, a gear case embedded in the felly and having an outer face conforming to the circumference of the felly, the gear case having a slot therein extending through the outer face thereof, a threaded head movably guided in the gear case and having a lug thereon extending through the slot in the case, a rim on the felly and having two abutments on opposite sides of the lug, co-operating wedging devices between the felly and the rim, a screw in the threaded head and rotatably supported in the gear case and having a gear fixed thereto, a worm rotatably supported in the gear case in connection with the worm and having a squared end portion whereby to rotate the worm, and a cover on the outer face of the gear case and extending over the slot therein, the cover being connected with the lug to be moved thereby.

6. In a vehicle wheel, the combination of a wheel felly portion having an opening in its inner circumferential portion and an aperture in its front side, a gear case embedded in the felly portion and having a chamber adjacent to one end thereof to receive a tire-inflation tube, the chamber being arranged at said opening and having a closure plug therein, the gear case having a slot extending from its interior to the outer face thereof and having also an offset portion arranged opposite to said aperture, a head movably guided in the gear case and having a lug thereon and having also screw threads therein, the lug extending through said slot, a rim on the felly portion to be operated by said lug, a screw extending into said head and provided with a gear, and a worm arranged in the offset portion of the gear case and in connection with said gear, the worm having journals supported in said offset portion, one of the journals having a squared portion extending into said aperture.

In testimony whereof, I affix my signature in presence of two witnesses.

KARL I. NUTTER.

Witnesses:
E. T. SILVIUS,
ROBERT LIEBRICH.